(12) United States Patent
Russell

(10) Patent No.: US 6,732,556 B1
(45) Date of Patent: May 11, 2004

(54) ANTI-THEFT DEVICE FOR MOUNTING ON BRAKE AND ACCELERATOR PEDALS

(76) Inventor: Michael Russell, 35150 Park Pl., Romulus, MI (US) 48174

( * ) Notice: Subject to any disclaimer, the term of this patent is extended or adjusted under 35 U.S.C. 154(b) by 0 days.

(21) Appl. No.: 10/449,621

(22) Filed: May 30, 2003

(51) Int. Cl.⁷ .................................................. G05G 5/00
(52) U.S. Cl. ............................ 70/201; 70/198; 70/163; 70/164; 70/54
(58) Field of Search ............................. 70/198–204, 238, 70/158, 160, 163, 164, 166, 167, 52–56, 178

(56) References Cited

U.S. PATENT DOCUMENTS

| | | | |
|---|---|---|---|
| 1,318,443 A | 10/1919 | Gimperling | 70/200 |
| 1,444,935 A * | 2/1923 | Mokracek | 70/200 |
| 1,554,388 A * | 9/1925 | Thorne | 70/199 |
| 1,579,395 A * | 4/1926 | Rohm et al. | 70/199 |
| 3,613,410 A | 10/1971 | Shaw | 70/202 |
| 3,898,823 A * | 8/1975 | Ludeman | 70/200 |
| 4,076,095 A | 2/1978 | Adamski | 70/14 |
| 4,333,326 A | 6/1982 | Winters | 70/203 |
| 4,632,209 A | 12/1986 | Russell | 70/199 |
| 4,700,555 A * | 10/1987 | Robertson et al. | 70/203 |
| 4,876,865 A | 10/1989 | Trinidad et al. | 70/203 |
| 4,912,952 A | 4/1990 | Magrobi | 70/199 |
| 5,082,213 A * | 1/1992 | Torres | 244/224 |
| 5,094,092 A | 3/1992 | Hsieh | 70/199 |
| 5,282,373 A * | 2/1994 | Riccitelli | 70/199 |
| 5,359,868 A | 11/1994 | Villani | 70/203 |
| 5,537,846 A | 7/1996 | Simon | 70/202 |
| 5,613,382 A | 3/1997 | Uter | 70/199 |
| 6,131,424 A * | 10/2000 | Dixon | 70/198 |
| 6,250,589 B1 * | 6/2001 | Russ et al. | 244/224 |
| 6,499,324 B2 * | 12/2002 | Reeb et al. | 70/201 |

* cited by examiner

*Primary Examiner*—Anthony Knight
*Assistant Examiner*—John B. Walsh
(74) *Attorney, Agent, or Firm*—Dykema Gossett PLLC (57) ABSTRACT

The anti-theft device is for covering the brake and gas pedals of a vehicle. It includes a gas pedal cover placed over the gas pedal, a brake pedal cover placed over the brake pedal, with the brake pedal cover having an upwardly extending ledge having an opening therein. A slide bracket is placed opposite the brake pedal cover and has an opening opposite the opening in the ledge. An L-shaped bracket is provided having a pair of arms. Fasteners connect each arm of the L-shaped bracket to one of the pedal covers. A padlock extends through the openings in the slide bracket and ledge for securing the slide bracket to the brake pedal cover.

24 Claims, 5 Drawing Sheets

ANTI-THEFT DEVICE FOR MOUNTING ON BRAKE AND ACCELERATOR PEDALS

BACKGROUND OF THE INVENTION

1. Field of the Invention

This invention relates to anti-theft devices and is more particularly concerned with an improved anti-theft device for immobilizing the accelerator (gas) and brake pedals of a vehicle.

2. Description of the Prior Art

"Motor vehicles" as used herein refers to trucks and automobiles having at least brake and gas pedals and which also may have a clutch pedal. Motorcycles and similar vehicles are excluded from the scope of this invention.

Security devices for theft prevention of motor vehicles have taken many different forms such as door locks, burglar alarms, pedal locks, secondary ignition switches and the like have been used with both greater and lesser degrees of effectively preventing the theft of motor vehicles. Anti-theft or locking devices for the pedals of a motor vehicles have been proposed as effective in preventing the unauthorized use of such motor vehicles. However, certain of these locking or anti-theft devices of the prior art are mechanically complicated and in many instances easily circumvented so as not to prevent unauthorized persons from stealing the motor vehicles.

The following prior art patents are illustrative of pedal locking devices utilizing padlocks.

U.S. Pat. No. 1,318,443 issued to John E. Gimperling illustrates a locking device which consists of an angular-shaped block adapted to conform substantially to the floor line of an automobile and the angular position of the foot levers of the automobile. The block may be positioned relative to one or more of the foot levers of the automobile in a position to prevent operation of the foot levers. The block may be locked in such a position by any suitable locking means to render the foot levers inoperative.

U.S. Pat. No. 4,333,326 to Robert E. Winters relate to a brake and clutch lock assembly where a vehicle lock immobilizes the shaft of a single foot pedal assembly of the vehicle. The vehicle lock comprises a base which contacts the floor of the vehicle and fits between the floor and the shaft of the pedal. Two wall members extend upwardly from one end of the base and together with the base form a cradle for the shaft. A lock mechanism, such as a padlock, passes through one or more holes in each of the walls to thereby lock the shaft in a cradle position and render the foot pedal assembly and vehicle inoperative.

U.S. Pat. No. 4,632,209 to Theodore C. Russell relates to an anti-theft locking device for immobilizing the foot pedal assembly. It is adapted to be raised from a stored position abutting the floor to an upwardly inclined immobilizing position in contact with the foot pedal assembly. A second rigid plate is hingably attached to the first rigid plate and adapted to be folded under the first rigid plate in the stored position to be moved to a position in which to brace the first rigid plate securely in position when the latter is in the immobilizing position. Locking means are provided to secure the second rigid plate in the brace position when the device is activated to immobilize the foot pedal assembly.

U.S. Pat. No. 5,094,092 to Tung-Chiang Hsieh discloses a vehicle pedal lock having a base plate with an opening recess and a pair of hooks molded at the ends of the bracket, with the hooks defining openings facing outwardly. The center recess and the openings defining the two hooks are adapted to receive the arms of the control pedals. A pair of legs are formed with different height corresponding to the respective hooks to prevent depressing any of the control panels illegally.

U.S. Pat. No. 5,359,868 issued to Fiorenzo L. Villani for an automotive anti-theft gas pedal lock where a lever actuated housing enclose and disable a gas pedal. A padlock extends through openings provided in the levers for maintaining the top portion in a closeable position about the container for locking the foot pedal therein.

U.S. Pat. No. 5,537,846 to David A. Simon relates to a motor vehicle anti-theft device to disable the brake pedal of the vehicle. The device functions to lock the pedal in a brake release position so that the vehicle cannot be started since the brake/shaft interlock cannot be actuated.

U.S. Pat. No. 5,613,382 to Donavon S. Uter relates to a device for securing the accelerator and brake pedals of a vehicle. The device includes a lower plate having two pedal receiving notches formed along its length and an upper plate with two corresponding pedal receiving notches formed along its length. These two plates are pivotally related to each other such that the two sets of notches can together form a first brake pedal receiving aperture and a second accelerator pedal receiving aperture. A locking device is secured within the secondary apertures of the lower plate and upper plate. The lock is defined by a key receiving end and a cylinder end. This lock has a first orientation which permits its removal from the two apertures and a second orientation which prohibits its removal and keeps the two plates in a closed orientation.

The anti-theft device for securing the accelerator and brake pedals of the vehicle according to the present invention substantially departs from the conventional concepts and designs of the prior art and in so doing provides an apparatus or device which is easily installed, inexpensive to manufacture and effective in preventing the theft of a motor vehicle.

SUMMARY OF THE INVENTION

It is a feature of the present invention to provide an improved anti-theft device for securing the accelerator and brake pedals of a vehicle thereby immobilizing same.

Another feature of the present invention is to provide an anti-theft locking device of the aforementioned type comprising a gas pedal cover enclosing the gas pedal and being spaced therefrom for preventing actuation of the gas pedal should the gas pedal cover be depressed, with the gas pedal cover inclined upwardly and having upper and lower ends. With such a construction, the gas pedal cover has a front wall and a pair of side walls, with the cover being open at the top and on the back and closed by a wall on the bottom. The edges of the gas pedal cover at the back engage the floor or floorboard of the vehicle. The side wall of the gas pedal cover closest to the brake pedal has a series of bolt openings arranged in a predetermined pattern.

Still another feature of the present invention is to provide an anti-theft locking device of the aforementioned type wherein a brake pedal cover of generally U-shaped configuration has a pair of spaced apart upper and lower flanges which are connected on one side by an elongated web, with the other side of the cover being open to receive the brake pedal. With such a construction, the lower flange of the brake pedal cover has a series of bolt openings arranged in a predetermined pattern.

A further feature of the present invention is to provide an anti-theft locking device of the aforementioned type wherein an L-shaped bracket having a pair of arms is provided, with each arm having a series of bolt openings arranged in a predetermined pattern. The bolt openings in one of the arms overlies selected bolt openings in the side wall of the gas pedal cover, while the bolt openings in the other of the arms underlie the selected bolt openings in the lower flange of the brake pedal cover. A plurality of fasteners extend through the aligned bolt openings to secure the legs of the L-shaped bracket respectively to the brake pedal cover and to the gas pedal cover.

A still further feature of the present invention is to provide a slide bracket opposite the open side of the brake pedal cover to prevent access to the brake pedal and locking means for securing the slide bracket to the brake pedal cover.

Another feature of the present invention is to provide an anti-theft locking device of the aforementioned type wherein the locking means is a key operated or combination padlock engageable through aligned openings provided in the slide bracket and in the brake pedal cover.

Still another feature of the present invention is to provide an anti-theft locking device of the aforementioned type wherein the upper flange of the brake pedal cover has a longitudinal edge which extends upwardly at a 90° angle to form an ledge, with an opening being provided in the ledge. An elongated slot is provided in the upper flange spaced from the longitudinal edge. The slide bracket has a slot located between a pair of spaced apart legs on opposite sides of the slot, a centrally located tab above the slot and connected to the legs and a pair of horizontal ears located on the upper edges of the legs. With such a construction, the slide bracket extends through the elongated slot in the upper flange, with the legs resting on the lower flange and with the ears abutting the top surface of the upper flange. The openings in the tab and the ledge are aligned. The locking means is a padlock engageable through the aligned openings of the tab and ledge for maintaining the components parts of the anti-theft device in a locked position.

A further feature of the present invention is to provide an anti-theft locking device of the aforementioned type wherein the ends of the brake pedal cover may be open or provided with walls for closing the interior of the brake pedal cover. The device utilizes a plurality of fasteners comprising a bolt and a lock nut, usually two fasteners connecting each leg of the L-shaped bracket and to the respective pedal covers.

Another feature of the present invention is to provide an anti-theft locking device wherein an elongated slot is provided in the lower flange of the brake pedal cover beneath the elongated slot in the upper flange, with the legs of the slide bracket nesting in the elongated slot of the lower flange to provide stability. With such a construction the elongated slots of the slide bracket are of equal length and width. The tab abuts the ledge and the holes therein are aligned to receive the padlock which may be key operated or which utilizes a combination lock.

Thus the present locking system is seen to be of relatively simple construction; to be easy to engage with and to be removed from the gas and brake pedals; to be easy to maintain; and to provide substantial anti-theft security for motor vehicles.

These and other aspects of the present invention are set forth in the following detailed description and claims, particularly when considered in conjunction with the drawings in which like parts bear like reference numerals.

DESCRIPTION OF THE PREFERRED EMBODIMENT

Figure 1:
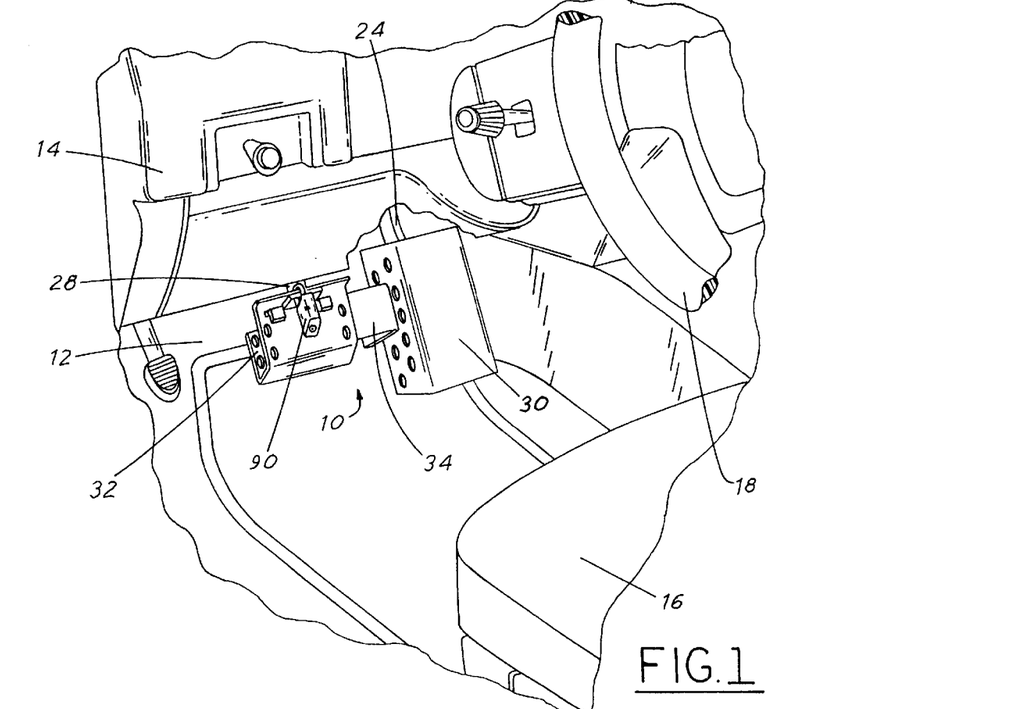
FIG. 1 is a fragmentary perspective view of the interior of a motor vehicle and illustrating the anti-theft device covering the brake pedal and the accelerator pedal.
Figure 2:
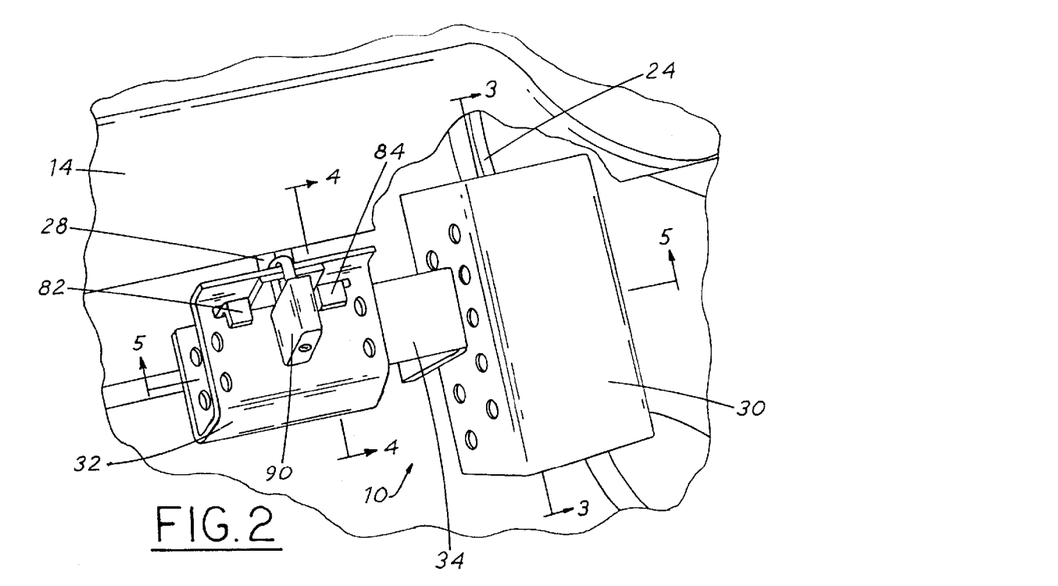
FIG. 2 is an enlarged view portion of FIG. 1 and illustrating the anti-theft device in a locked position over the accelerator and brake pedals.

Referring now to the drawings, and in particular to FIGS. 1 and 2 thereof, a new and improved anti-theft device is illustrated for securing the accelerator and brake pedals of a vehicle embodying the principles and concepts of the present invention and generally designated by the number 10. The same device 10 may be applied to different makes and brands of motor vehicles by adjusting the location of the L-shape bracket in relation to the covers.

Specifically, the invention relates to a device for securing the accelerator or gas and brake pedals of a vehicle from unauthorized use. In its broadest context, the present invention includes a gas pedal cover placed over the gas pedal and a brake pedal cover placed over the brake pedal. An L-shaped bracket has a pair of arms, one arm is connected to the brake pedal cover and the other arm is connected to the gas pedal cover. A slide bracket is located opposite the open side of the brake pedal cover for closing it. Locking means are provided for securing the slide bracket to the brake pedal cover. The details as to the various components of the present invention and the manner in which they interrelate will be described in greater detail hereinafter.

Figure 3:
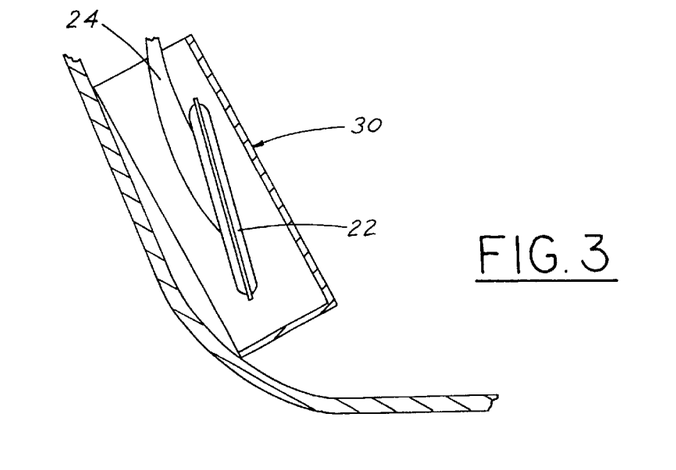
FIG. 3 is a sectional view taken on the line 3—3 on FIG. 2 and illustrating the gas pedal cover overlying the gas pedal, with the edges at the opening or back side of the cover engaging the upwardly curved floor or floor board of the motor vehicle.
Figure 4:
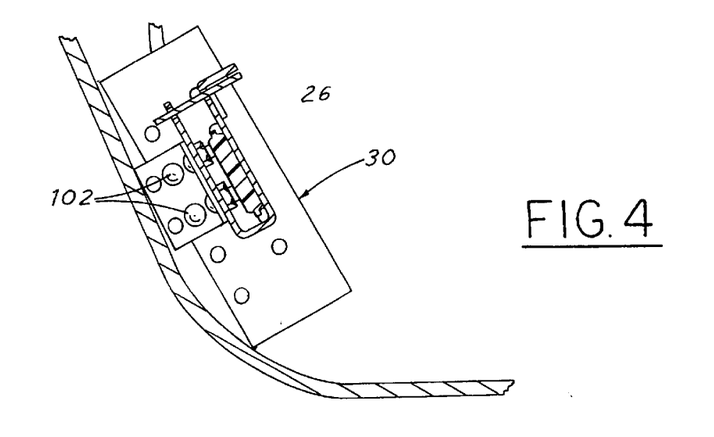
FIG. 4 is a sectional view taken on the line 4—4 of FIG. 2 and illustrating the brake pedal cover and slide bracket applied over the brake pedal.

The anti-theft device 10 is attached over the accelerator or gas pedal and the brake pedal that normally extend downwardly along an inclined floor board 12 located under the dashboard 14 and located forwardly of the driver's seat 16 and steering wheel 18. The vehicle is normally locked when the ignition key is removed from the ignition box, not shown. Forwardly of the driver's seat 16 is the usual gas or accelerator pedal 22 supported by a lever 24 and hingedly mounted in the usual manner as best illustrated in FIG. 3. The brake pedal 26 is hingedly mounted on a lever 28 in the usual manner.

The anti-theft device comprises four major components including a gas pedal cover 30, a brake pedal cover 32, an L-shaped connecting bracket 34 which connect the covers together as a unitary unit and a slide bracket 70 which closes the open side of the brake pedal cover.

Figure 5:
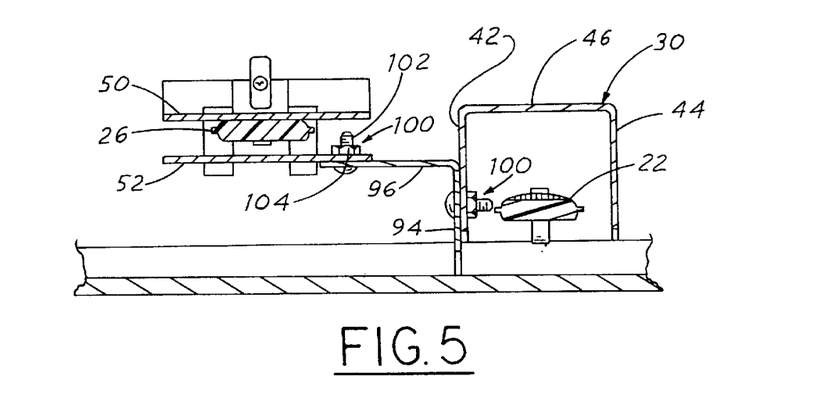
FIG. 5 is a sectional view taken on the line 5—5 of FIG. 2 and illustrating in part the manner of securing the L-shaped bracket to the gas and brake pedal covers.
Figure 12:
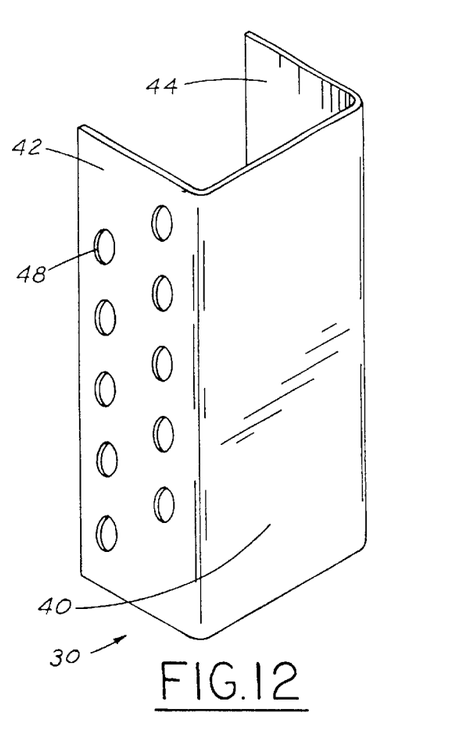
FIG. 12 is a perspective view of the gas pedal cover and illustrating the open end of the top of the cover.

The gas pedal cover 30 is of U-shaped cross section as best illustrated in FIGS. 5 and 12. It includes a front wall or panel 40 and a pair of side walls or panels 42 and 44. The top of the gas pedal cover 30 is open as is the back side thereof as best illustrated in FIGS. 3, 5 and 12. The panels 40, 42 and 44 are of equal height. The bottom of the cover 30 is closed by a wall or panel 46. Flange 42 is provided with a series of bolt openings 48 which are arranged in a predetermined pattern. The bolt openings 48 are arranged in two rows, with the openings in one row offset from the corresponding opening in the other row.

Figure 6:
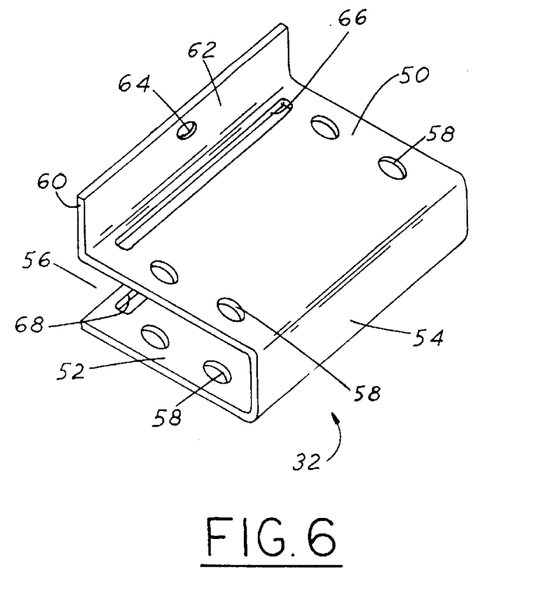
FIG. 6 is a perspective view of the brake pedal cover.
Figure 7:
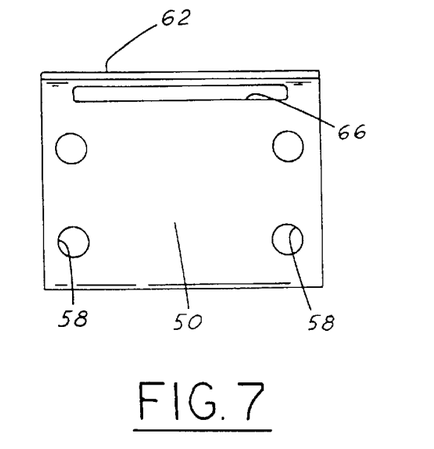
FIG. 7 is a top view of the brake pedal cover.

The brake pedal cover 32 as best illustrated in FIGS. 6 and 7 is of U-shaped configuration. It has an elongated upper flange 50 and an elongated lower flange 52 which are connected at one side by an elongated web 54. The other side 56 is open to receive the brake pedal 26 usually with some clearance therebetween.

The top flange 50 and the lower flange 52 are each provided with a series of bolt openings 58 arranged in a predetermined pattern although only the bolt openings 58 in one of the flanges will be used for any one installation as will subsequently appear. The top flange 50 has the longitudinal edge 60 bent or turned upwardly at a 90° angle to form a ledge 62. A bolt opening 64 centrally located between the ends of the ledge 62 is provided. An elongated slot 66 is provided in the upper or top flange 50. The slot 66 overlies another elongated slot 68, which is optional, provided in the lower flange 52 as best illustrated in FIG. 6. The elongated slots 66 and 68 are of equal length and width.

Figure 8:
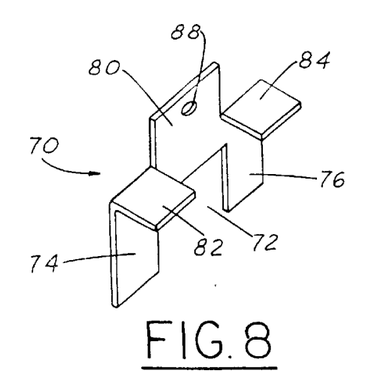
FIG. 8 is a perspective view of the slide bracket insertable in the slot provided in the brake pedal cover.
Figure 9:
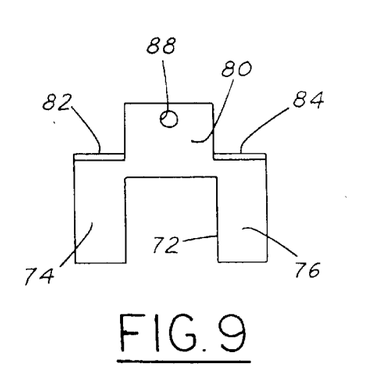
FIG. 9 is a front elevational view of the slide bracket.
Figure 10:
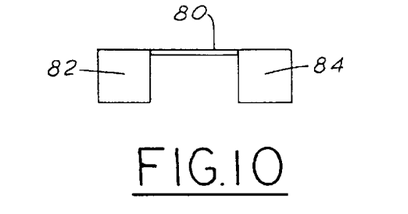
FIG. 10 is a top view of the slide bracket.
Figure 11:
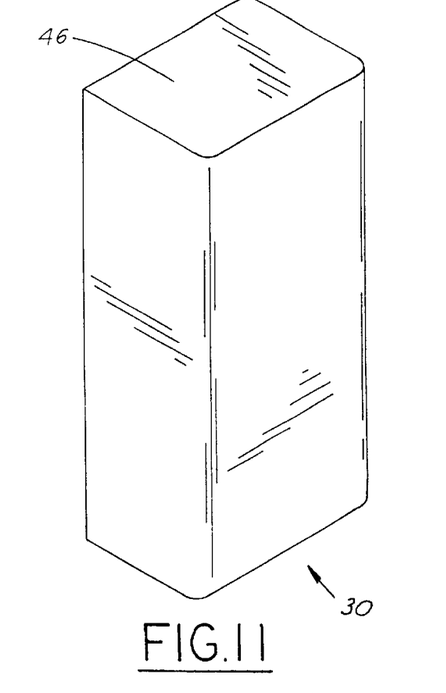
FIG. 11 is a perspective view of the accelerator or gas pedal cover, turned 180°, and illustrating the bottom wall at the lower end of the cover.

A slide bracket 70 as best illustrated in FIGS. 8–10 inclusive is located opposite the open side of the gas pedal cover 32 to close the interior thereof and to prevent the device from being removed until authorized. The slide bracket 70 is made from a generally flat piece of steel and has a slot 72 provided therein in the lower portion of the slide 70. The slot 72 is located between a pair of spaced apart legs 74 and 76 which are of equal width and height. A centrally located tab 80 is located above the slot 72 and is joined or connected to the legs 74 and 76. The slide bracket 70 is provided with a pair of forwardly extending horizontal ears 82 and 84. The tab 80 is provided with a bolt opening 88. The tab 80 cooperates with the ledge 62. The purpose of the ears 82 and 84 is to rest upon the top surface of the upper flange 50 when the slide bracket 70 is assembled, with the legs 74 and 76 resting on the lower flange 52 or nesting in the slot 68. Locking means such as a padlock 90 is engageable through the openings 64 and 88 provided in the ledge 62 and tab 80 as best illustrated in FIGS. 1 and 2.

Figure 16:
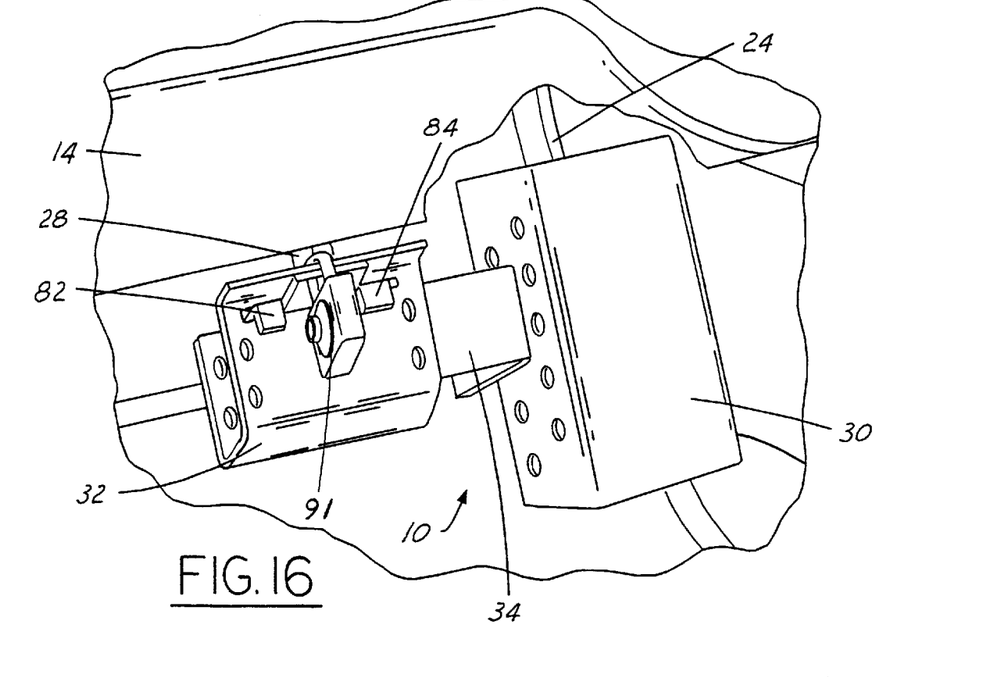
FIG. 16 is a view similar to FIG. 2 and illustrates the use of a combination lock rather than a padlock.

The padlock 90 may be key operated as illustrated in FIGS. 1 and 2 or a combination 91 may be used as shown in FIG. 16.

Figures 13, 14, 15:
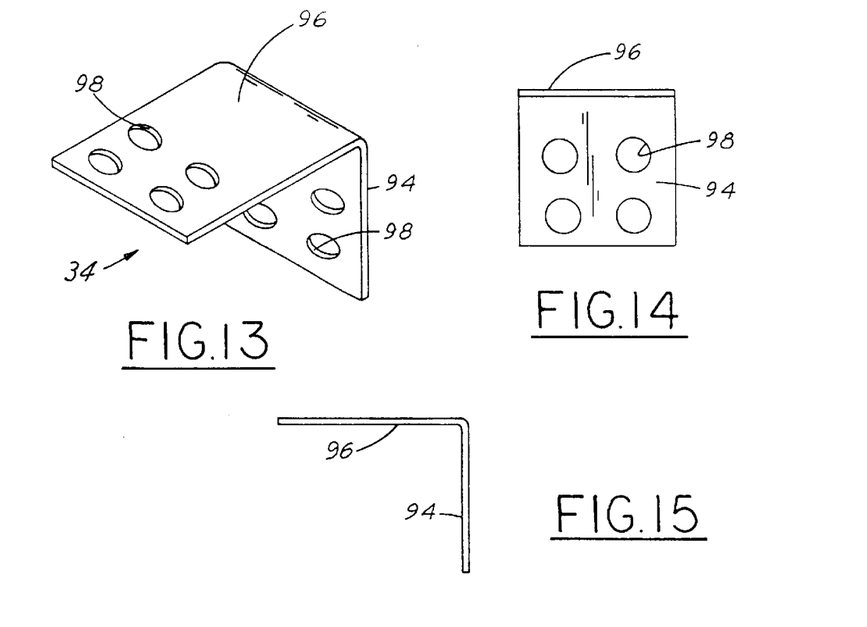
FIG. 13 is a perspective view of the L-shaped bracket for connecting the gas and brake pedal covers.
FIG. 14 is a front view of the L-shaped bracket.
FIG. 15 is a side elevational view of the L-shaped bracket.

The L-shaped bracket 34 as best illustrated in FIGS. 13–15 inclusive is provided to connect the gas pedal cover 30 and the brake pedal cover 32 together. The L-shaped bracket 34 has a pair of arms 94 and 96, with each arm having a series of bolt openings 98 arranged in a predetermined pattern. The bolt openings 98 in arm 94 overlie selected bolt openings 48 in the side wall 42 of the gas pedal cover 30. Selected bolt openings 98 in the other arm 96 underlie selected bolt openings 58 provided in the lower flange 52 of the brake pedal cover as illustrated in FIG. 5.

Each arm 96, 98, is connected to the respective covers 30 and 32 by a plurality of fasteners 100 which extend through the aligned bolt openings to secure the legs 94, 96 of the L-shaped bracket 34 respectively to the brake pedal cover 30 and to the gas pedal cover 32. Each fastener 100 comprises a bolt 102 and a nut or lock nut 104. It should be appreciated that separate lock washers may be utilized around the bolt 102 underlying the nut 104 in the usual manner.

In operation, a user takes the component parts of the anti-theft device 10 and secures the L-shaped bracket 34 in the proper position along the side wall 48 of the gas pedal cover 30. The gas pedal cover 30 is then placed around the gas pedal 22 so as to enclose it as in FIGS. 3 and 5. The cover 30 is spaced from the gas pedal 22 for preventing the actuation of the gas pedal 22 should the gas pedal cover 30 be depressed. The cover 30 is inclined upwardly as shown in FIGS. 1 and 2. The U-shaped brake pedal cover 32 is then placed over the brake pedal 26 and selected openings in the L-shaped bracket 34 and the lower flange 52 are aligned and thereafter the fasteners 100 are inserted in the aligned bolt openings. Finally, the slide bracket 70 is inserted through the upper slot 66 of the cover 32 until the legs 74 and 76 nest in the slot 68 provided in the lower flange 52. The ears 82 and 84 rest on the top surface of the flange 50. At such time the bolt openings 64 and 88 are aligned and as the final step the padlock 90 is inserted into the aligned openings of the tab 80 and ledge 62 for maintaining the component parts of the anti-theft device 10 in a locked position. The vehicle operator may now remove the key from the lock 90 to insure that the device 10 is maintained in a closed and locked configuration. Thus, any unauthorized use of the vehicle is prohibited since neither the accelerator or gas nor the brake pedals can be employed or operated.

As to the manner of usage and operation of the present invention, the same should be apparent from the above description. Accordingly, no further discussion relating to the manner of usage and operation will be provided.

With respect to the above description, it will be realized that the optimum dimensional relationship for the parts of the invention to include variations in size, material, shape, form, function and manner of operation, assembly and use are deemed readily apparent and obvious to one skilled in the art and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described and, accordingly, any suitable modifications and equivalents may be resorted to, falling within the scope of the invention.

What I claim is:

1. An anti-theft locking device for immobilizing the gas pedal and brake pedal normally necessary for operation of a vehicle, said anti-theft locking device comprising:

a gas pedal cover enclosing the gas pedal and being spaced therefrom for preventing actuation of the gas pedal should the gas pedal cover be depressed;

said gas pedal cover being inclined upwardly and having upper and lower ends;

said gas pedal cover having a front wall and a pair of side walls, said gas pedal cover being opened on the top and on the back and closed by a wall on the bottom, with the edges of the gas pedal cover at the upper and lower ends engaging the floor of the vehicle;

the side wall of said gas pedal cover closest to the brake pedal having a series of bolt openings arranged in a predetermined pattern;

a brake pedal cover of generally U-shaped configuration having a pair of spaced apart elongated upper and lower flanges which are connected at one side by an elongated web, the other side being open to receive the brake pedal;

said lower flange of said brake pedal cover having a series of bolt openings arranged in a predetermined pattern;

an L-shaped bracket having a pair of arms, each arm having a series of bolt openings arranged in a predetermined pattern;

the bolt openings in one of said arms overlying selected bolt openings in said side wall of said gas pedal cover;

the bolts openings in the other of said arms underlying the selected bolt openings in said lower flange of said brake pedal cover;

a plurality of fasteners extending through the aligned bolt openings to secure the legs of said L-shaped bracket respectively to said brake pedal cover and to said gas pedal cover;

a slide bracket opposite the open side of said brake pedal cover to prevent access to said brake pedal; and locking means for securing said slide bracket to said brake pedal cover.

2. The anti-theft locking device of claim 1, wherein each of said plurality of fasteners comprise a bolt and a lock nut.

3. The anti-theft locking device of claim 1, wherein said locking means is a padlock engageable through aligned openings provided in said slide bracket and in said brake pedal cover.

4. The anti-theft locking device of claim 1, wherein said upper flange has a longitudinal edge which extends upwardly at a 90° angle to form a ledge;

an opening in said ledge;

an elongated slot in said upper flange spaced from said longitudinal edge;

said slide bracket having a slot located between a pair of spaced apart legs on opposite sides of said slot, a centrally located tab located above said slot and connected to said legs and a pair of horizontal ears located on the upper edges of said legs;

said slide bracket extending through said elongated slot in said upper flange, with the legs resting on said lower flange and with said ears abutting the top surface of said upper flange, the openings in said tab and said ledge being aligned; and said locking means being a padlock engageable through said aligned openings of said tab and said ledge for maintaining the component parts of said anti-theft device in a locked position.

5. The anti-theft locking device of claim 1, wherein the ends of said brake pedal cover are open.

6. The anti-theft locking device of claim 1, wherein the ends of said brake pedal cover are each provided with a wall to close the interior of said brake pedal cover.

7. The anti-theft locking device of claim 1, wherein there are two fasteners connecting each leg of said L-shaped bracket to the respective pedal covers.

8. The anti-theft locking device of claim 4, wherein an elongated slot is provided in said lower flange of said brake pedal cover beneath the elongated slot in said upper flange, the legs of said slide bracket nesting in said elongated slot of said lower flange.

9. The anti-theft locking device of claim 8, wherein said elongated slots are of equal length and width.

10. The anti-theft locking device of claim 4, wherein said tab abuts said ledge when the holes therein are aligned ready to receive said padlock.

11. The anti-theft locking device of claim 4, wherein said padlock is key operated.

12. The anti-theft locking device of claim 4, wherein said padlock is a combination lock.

13. An anti-theft locking device for immobilizing the gas pedal and brake pedal normally necessary for operation of a vehicle, said anti-theft locking device comprising:

a gas pedal cover enclosing the gas pedal and being spaced therefrom for preventing actuation of the gas pedal should the gas pedal cover be depressed;

said gas pedal cover being inclined upwardly and having upper and lower ends;

said gas pedal cover having a front wall and a pair of side walls, said gas pedal cover being opened on the top and on the back and closed by a wall on the bottom, with the edges of the gas pedal cover at the upper and lower ends engaging the floor of the vehicle;

a brake pedal cover of generally U-shaped configuration having a pair of spaced apart elongated upper and lower flanges which are connected at one side by an elongated web, the other side being open to receive the brake pedal;

an L-shaped bracket having a pair of arms, one arm connected to said gas pedal cover and the other arm connected to said brake pedal cover;

a slide bracket opposite the open side of said brake pedal cover to prevent access to said brake pedal; and locking means for securing said slide bracket to said brake pedal cover.

14. The anti-theft locking device of claim 13, wherein said upper flange has a longitudinal edge which extends upwardly at a 90° angle to form a ledge;

an opening in said ledge;

an elongated slot in said upper flange spaced from said longitudinal edge;

said slide bracket having a slot located between a pair of spaced apart legs on opposite sides of said slot, a centrally located tab located above said slot and connected to said legs and a pair of horizontal ears located on the upper edges of said legs;

said slide bracket extending through said elongated slot in said upper flange, with the legs resting on said lower flange and with said ears abutting the top surface of said upper flange, the openings in said tab and said ledge being aligned; and said locking means being a padlock engageable through said aligned openings of said tab and said ledge for maintaining the component parts of said anti-theft device in a locked position.

15. The anti-theft locking device of claim 13, wherein the ends of said brake pedal cover are open.

16. The anti-theft locking device of claim 13, wherein the ends of said brake pedal cover are each provided with a wall to close the interior of said brake pedal cover.

17. The anti-theft locking device of claim 13, wherein there are two fasteners connecting each leg of said L-shaped bracket to the respective pedal covers.

18. The anti-theft locking device of claim 14, wherein an elongated slot is provided in said lower flange of said brake pedal cover beneath the elongated slot in said upper flange, the legs of said slide bracket nesting in said elongated slot of said lower flange.

19. The anti-theft locking device of claim 18, wherein said elongated slots are of equal length width.

20. The anti-theft locking device of claim 14, wherein said tab abuts said ledge when the holes therein are aligned ready to receive said padlock.

21. The anti-theft locking device of claim 14, wherein said padlock is key operated.

22. The anti-theft locking device of claim 14, wherein said padlock is a combination lock.

23. An anti-theft device for covering the brake and gas Pedals of a vehicle comprising a gas pedal cover placed over the gas pedal, a brake pedal cover placed over the brake pedal, said brake pedal cover having an upwardly extending ledge having an opening therein, a slide bracket opposite said brake pedal cover and having an opening opposite the opening in said ledge, an L-shaped bracket having a pair of arms, fastening means connecting each arm of said L-shaped bracket to one of said pedal covers, and locking means extending through said openings for securing said slide bracket to said brake pedal cover, said locking means being a key or combination lock engageable through aligned openings provided in said slide bracket and in said brake pedal cover.

24. The anti-theft locking device of claim 23, wherein each of said fastening means comprise a bolt and a lock nut.

* * * * *